Sept. 3, 1963　　　J. W. SCHWERDT　　　3,102,515
INTERNALLY COATED INTAKE MANIFOLD FOR
INTERNAL COMBUSTION ENGINES
Filed Sept. 21, 1961　　　　　　　　　　　　2 Sheets-Sheet 1
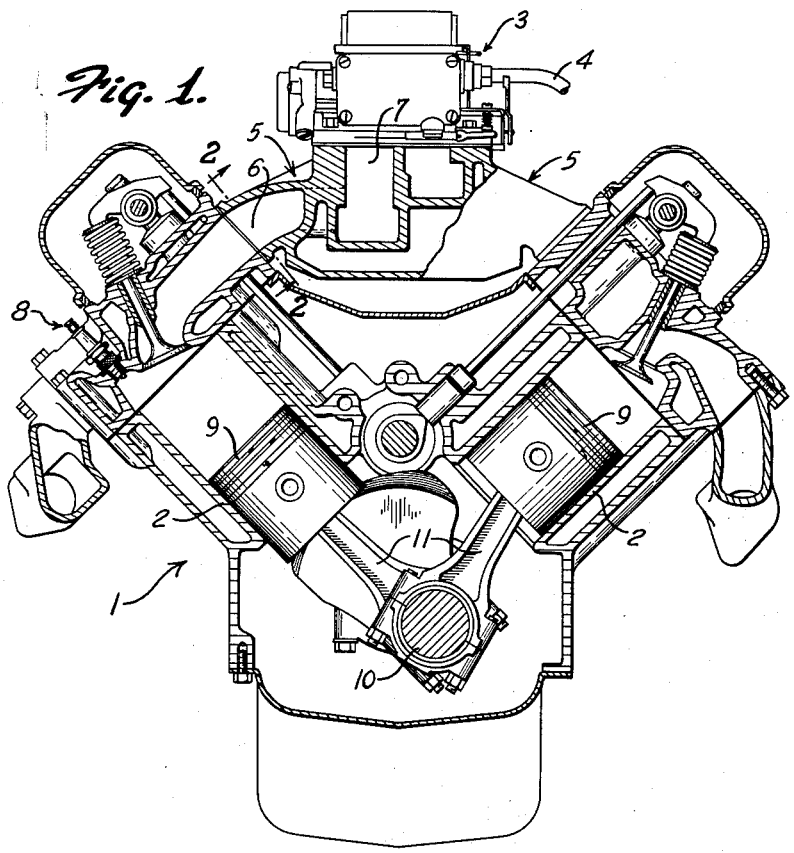
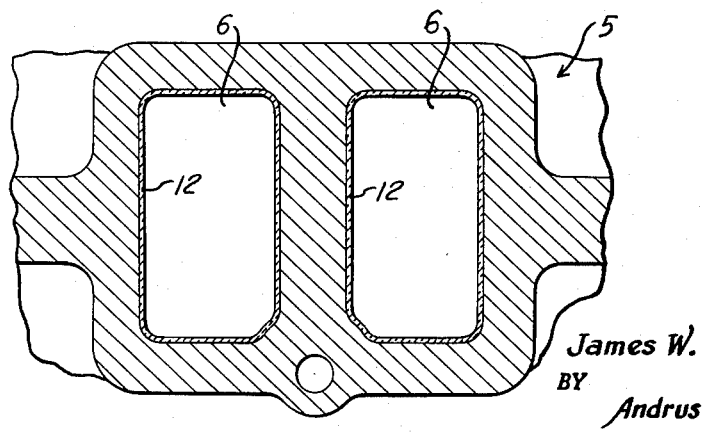
INVENTOR.
James W. Schwerdt
BY
Andrus & Starke
Attorneys INVENTOR.
James W. Schwerdt
BY Andrus & Starke
Attorneys ID 3,102,515
Patented Sept. 3, 1963

3,102,515
INTERNALLY COATED INTAKE MANIFOLD FOR INTERNAL COMBUSTION ENGINES
James W. Schwerdt, Mequon, Wis., assignor to A. O. Smith Corporation, Milwaukee, Wis., a corporation of New York
Filed Sept. 21, 1961, Ser. No. 139,670
5 Claims. (Cl. 123—1)

This invention relates to an intake manifold for an internal combustion engine, and more particularly to an internally coated intake manifold having a substantially smooth internal surface to increase overall engine efficiency by increasing the brake horsepower of the engine.

The conventional intake manifold for an internal combustion engine is made by casting iron in a sand mold. The casting of intake manifolds has proved particularly useful where the design of the manifold requires ports and devious passageways for water circulation or other purposes.

One of the disadvantages of a cast iron manifold is the fact that it has numerous surface defects caused by the sand grains. These surface asperities cause considerable turbulence as the air-fuel mixture flows through the intake manifold from the carburetor. The air-fuel vapor mixture is disturbed by the turbulent flow, and tends to condense on the internal walls of the intake manifold. This disturbance of the air-fuel vapor mixture partially defeats the purpose of the carburetor, and thereby decreases the efficiency of the engine.

In the past, professional automobile drivers have recognized the essential importance of extending the stability of the air-fuel mixture from the carburetor into the individual cylinders or combustion chambers of the internal combustion engine. Professional drivers have machine buffed the internal surfaces of the intake manifolds to accomplish the desired smooth flow and avoid the turbulence caused by surface asperities in conventional intake manifolds. The above method, that is, smoothing the inner wall of the intake manifold by machine buffing, is not feasible for mass production, and therefore, it has been economically impossible to include such manifolds on the mass produced automobile.

This invention provides an intake manifold which may be produced by the conventional casting method and which is subsequently glass lined on the internal surface to provide a smooth, non-turbulent flow for the air-fuel mixture. This invention is economical to perform because no machining operations are required, and the method of applying the glass coating to the inside of the manifold is relatively simple.

It is important to distinguish the glass lined intake manifold from lined exhaust manifolds which appear in the prior art. The sole purpose of the glass lining in the exhaust manifold is to prevent corrosion. The glass lined intake manifold, on the other hand, is used mainly to provide uniform air-fuel mixtures to the individual combustion chambers with substantially no change from the point where the mixture is made in the carburetor to the point where it is received in the individual combustion chambers. A two-fold purpose in air-fuel mixture stabilization is accomplished by the internally coated intake manifold. Firstly, all turbulence is avoided by providing a smooth surface over which the air-fuel mixture flows. Secondly, the insulating characteristics of the coating, which may be a glass or a resin, prevents any substantial change in temperature of the air-fuel mixture. Thus it can be seen that a closer control over the vapor mixture being received in each combustion chamber of the engine is made possible.

In tests conducted under the direction of the applicant, an improvement of at least five percent in the brake horsepower rating of an eight cylinder combustion engine was obtained. As will be described more fully hereafter, the test results were compared to the brake horsepower rating of the same engine using a conventional unlined manifold in the "as cast" condition and these results were also compared to the performance of a sand blasted manifold.

The following drawings illustrate the best mode presently contemplated for carrying out the invention.

In the drawings,

FIGURE 1 is an end cross-sectional view of an internal combustion engine employing the present invention;

FIG. 2 is a section of the intake manifold taken on line 2—2 of FIGURE 1;

Figure 3:
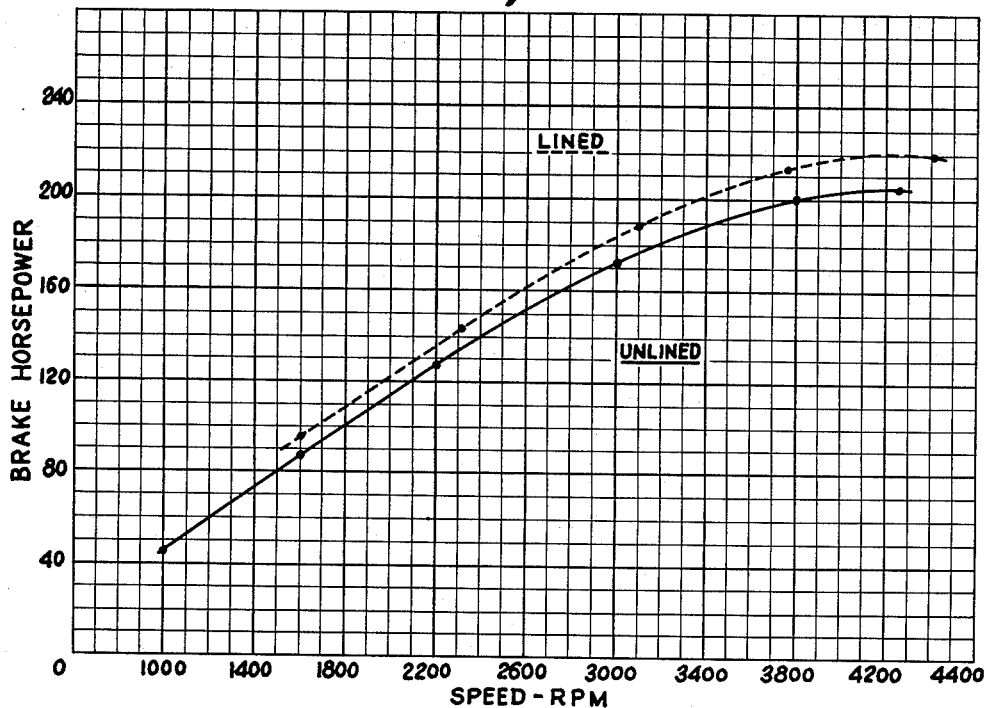
FIG. 3 is a graph comparing brake horsepower performance in an internal combustion engine incorporating the glass lined manifold with the same engine's brake horsepower performance with a conventional cast manifold.

The drawings illustrate an internal combustion engine 1, which includes a plurality of cylinders 2. A carburetor 3 is disposed adjacent the engine and has a gas tank line 4 entering therein to supply liquid gas to the carburetor. The engine 1 also has an internally glass lined intake manifold 5 connecting the engine cylinders 2 and the carburetor 3.

The intake manifold 5 has a plurality of outlet ports 6, each communicating with the respective cylinders 2 of the engine 1. The manifold 5 also is provided with a fuel mixture inlet 7 and the carburetor 3 is mounted over the fuel mixture inlet 7, which communicates directly with the manifold 5.

The spark plug assemblies 8 provide means for igniting the fuel mixture received in each cylinder 2 from the carburetor 3 through the manifold 5. A series of pistons 9 are slidable within the respective cylinders 2 and a crank shaft 10 is operably connected with each piston rod 11 and is adapted to provide driving force for a machine or vehicle.

In operation, gas is supplied through the gas tank line 4 to the carburetor 3, where it is mixed with air and then transported through the fuel mixture inlet 7 into the manifold 5. The gas is then distributed to the individual outlet ports 6 and thence to each cylinder 2.

As best shown in FIG. 2, the internal surface of the intake manifold 5 is provided with glass lining 12. In the cycle just described, the glass lining 12 of the intake manifold 5 substantially reduces turbulence in the flow of the fuel mixture from the carburetor 3 into the cylinders 2.

In addition, the glass lining 12 provides an insulation layer between the metal parts of the intake manifold 5 and the air-fuel mixture in the manifold. The combined effect of the insulation and the smooth flow of the air-fuel mixture through the manifold 5 increases the engine efficiency by permitting a much closer control of the air-fuel mixture received in the individual cylinders 2 from the carburetor 3.

Figure 4:
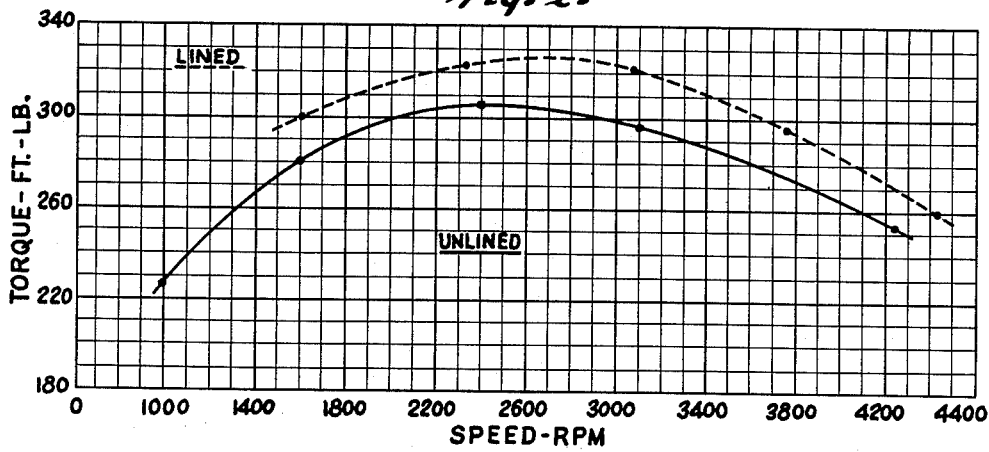
FIG. 4 is a graph comparing the torque per foot pound performance of the engine using a conventional manifold with the same engine using the glass lined intake manifold, and comparing the specific fuel consumption of the standard manifold with the lined manifold.

Tests were conducted which actually proved the increase in efficiency obtained by the use of the internally coated intake manifold. In the tests, a V-8 engine, having a 348 cubic inch displacement, a 4⅛ inch bore by a 3¼ inch stroke, rated at 250 horsepower at 4400 r.p.m. was employed. The engine was run at variable speeds in steps from 1200 r.p.m. to 4400 r.p.m. The brake horsepower of the engine, the torque and foot pounds and a specific fuel consumption were compared for the same engine using a standard cast manifold and then using the internally coated glass lined intake manifold of the invention. The test results were then graphed as shown in FIGS. 3 and 4.

The engine test employed was a standard wide open throttle, variable speed test conducted as follows:

(1) the engine was started and allowed to warm up approximately ½ hour at 600 r.p.m. and no load. The cooling water was adjusted, exhaust fans turned on, and a potentiometer connected to couples. All equipment was then checked for accuracy and the engine was timed.

(2) The load was gradually applied to the engine by means of a water dynamometer and the throttle was increased to the wide open position. The dynamometer load was adjusted to approximately 1000 r.p.m. and the engine was allowed to operate for 15 to 30 minutes.

(3) The dynamometer load was adjusted to obtain 1000 r.p.m. When the speed, pressures and temperature were stabilized, the following data was collected: engine revolutions, time, fuel was measured exhaust manifold pressure, intake manifold pressure, oil temperature, air temperature at carburetor, the exhaust manifold temperature, atmospheric pressure, the cooling water outlet temperature and the load on the dynamometer. The data was obtained at five minute intervals until all results were consistent.

(4) The dynamometer load was then adjusted to 1700 r.p.m. and allowed to stabilize. Then the procedure indicated in step 3 was repeated.

(5) The operation of step 3 was repated for speeds of 2300, 3000, 3700 and 4400 r.p.m. The curves shown in FIG. 3 represent averaged conditions for all tests conducted on specific manifolds. As shown in FIG. 3, the brake horsepower increases with the speed, if the torque is increasing, constant, or dropping off at a rate less than the speed is increasing, because the brake horsepower is a function of both the speed and of the load. As illustrated in FIG. 3, the brake horsepower curve for the lined manifold increased more rapidly and consistently attained a higher value than the rating for the unlined manifold. The peak value of brake horsepower was not reached in the illustrated tests for either the lined or unlined manifolds, but it appears that the unlined manifold has leveled off and started to decrease, as illustrated by the rapid descent of the curve for the unlined manifold in FIG. 3. The curve for the lined manifold, however, still shows a slight rate of increase.

The unlined manifold having a more turbulent flow characteristic, has an optimum value at which an increase in speed results in a decreasing brake horsepower curve, while the improved breathing characteristics of a glass lined manifold shows a noted improvement which increases the brake horse power curve up beyond the maximum recommended operating speed for the specific engine. The advantages of a glass lined manifold over an unlined manifold can be further enhanced by improving the engine design to more fully utilize the better breathing characteristics of the glass lined manifold.

A comparison of the specific brake horsepower values for the engine operated first with a conventional unlined intake manifold, and the same engine operated with a glass lined manifold showed an increase of approximately five percent in power output at all speeds for the engine. For example, for a speed of about 3800 r.p.m. and using the formula: percent increase equals B.H.P. (glass lined) —B.H.P. (unlined × 100 there was indicated an increase of five percent at this speed. The values shown on the graph vary from approximately 4.7 percent increase in brake horsepower at 2200 r.p.m. to 6.85 percent at 4200 r.p.m.

As shown in the graph of FIG. 4, the torque curves for the engine also reflect the same general trend. The maximum torque for the unlined manifold occurred at approximately 2300 r.p.m. while the maximum for the glass lined manifold has shifted to approximately 2700 r.p.m., thereby showing a considerable improvement in engine efficiency at higher speeds.

The specific fuel consumption values shown in FIG. 4 indicate a trend favoring a lower curve for the glass lined manifold. Reduced fuel consumption reflects the ability of the engine to use its fuel more efficiently, and the depressed curve is more desirable.

It can be seen that the overall efficiency of the engine is improved by the improved surface condition of the inside surface of the manifold, which thereby creates less turbulence and achieves better flow of the atomized fuel. It is significant that a gain in horsepower is obtained without increasing the fuel consumption of the engine.

In preparing the intake manifold 5, the glass lining is accomplished in the following manner. The manifold 5 is first sand blasted to roughen all internal surfaces. A slurry or suspension of a conventional glass frit with a mill addition in water is then slushed or sprayed on all internal surfaces of the manifold. The manifold precoating is then dried to evaporate the water in the suspension. The dry precoating is then hot dusted with additional glass frit to build up the thickness of the precoating.

The precoated manifold is then fired in an oven at a temperature from about 1300° F. to 1600° F. to fuse the glass to the internal surfaces of the manifold.

The resulting fired manifold has a smooth, glass lined internal surface which provides a non-turbulent air-fuel mixture flow when the manifold is used as an intake manifold in an internal combustion engine. The smooth, non-turbulent flow notably increases the brake horsepower efficiency of the engine.

Other materials, such as resins, can be coated on the inside of the intake manifold to provide this smooth surface which promotes non-turbulent flow of the air-fuel mixture, and closer temperature control in the intake manifold. The other materials contemplated are modified high temperature epoxy resins, certain ceramics, and also metals, such as zinc. It is important that the material chosen will not dissolve in the fuel, and that it will withstand the maximum intake manifold temperature during the engine warmup period. The material should withstand a temperature up to 400° F. in most applications. With certain resins it is considered feasible to simply dip the standard cast manifold in a molten solution of the coating material.

The resin coating may also be applied by means of a fluidized bed process. In this method of application, the manifold to be coated is first heated to a temperature ranging from 400° to 500° F.

When the unlined manifold has reached the desired temperature range, it is exposed to a "fluidized" cloud comprising a finely divided powder of a partially cured modified epoxy resin. The fluidized resin cloud is circulated through all the internal passages of the manifold by connecting all the openings to a vacuum or forced air system which also contains the resin powder. A vacuum system is preferable, because of the closer control possible.

The circulating powder fuses to the hot manifold surfaces and gradually builds up a smooth coating layer. When the coating thickness has reached a range of .031 inch to .063 inch, the manifold is removed from the fluidized cloud of partially cured resin and heated, as necessary, to complete the curing of the resin coating.

The internally coated intake manifold of this invention provides a means for increasing the efficiency of an internal combustion engine without increasing the fuel consumption, and eliminates the manual steps of machining and buffing formerly necessary to obtain an internally smooth surface intake manifold.

Various modes of carrying out the invention are contemplated as being within the scope of the following claims particularly pointing out and distinctly claiming this subject matter which is regarded as the invention.

I claim:

1. A method of improving the torque and brake horsepower efficiency of an internal combustion engine, comprising casting an intake manifold for an internal combustion engine, roughening the internal surfaces of said intake manifold, applying a glass frit to the roughened surface of the intake manifold, firing said glass frit at an elevated temperature to fuse the glass to said intake manifold to provide a smooth, glass lined internal surface on said intake manifold, installing said manifold between the carburetor and the individual cylinders in an internal combustion engine system, and running said engine with said intake manifold therein, thereby providing an internal combustion engine having increased torque and improved brake horsepower efficiency.

2. A method of improving the brake horsepower efficiency in an internal combustion engine, comprising casting an intake manifold for the engine, dipping the manifold in a liquid resin having thermosetting characteristics and which will withstand a temperature up to about 400° F., heating the manifold coated with liquid resin to cure the resin, thereby providing a smooth internal surface on said intake manifold, installing said manifold between the carburetor and the individual cylinders in an internal combustion engine system, and running said engine with said intake manifold therein, thereby providing an internal combustion engine having improved brake horsepower efficiency.

3. A method of improving the brake horsepower efficiency in an internal combustion engine, comprising casting an intake manifold for the engine, heating the manifold to a temperature in the range of 400° to 500° F., exposing all internal surfaces of the manifold to a fluidized cloud of a finely divided, partially cured epoxy resin, causing said finely divided epoxy resin to fuse to the internal surfaces of said manifold to build up a smooth coating layer ranging in thickness from .031 inch to .062 inch, heating the coated manifold to complete the curing of the resin, installing said manifold between the carburetor and the individual cylinders in an internal combustion engine system, and running said engine with said intake manifold therein, thereby providing an internal combustion engine having improved brake horsepower efficiency.

4. A method of increasing the torque in an internal combustion engine, comprising casting an intake manifold for the engine, dipping the manifold in a liquid resin having thermosetting characteristics and which will withstand a temperature up to about 400° F., heating the manifold coated with liquid resin to cure the resin, thereby providing a smooth internal surface on said intake manifold, installing said manifold between the carburetor and the individual cylinders in an internal combustion engine system, and running said engine with said intake manifold therein, thereby providing an internal combustion engine having increased torque.

5. A method of increasing the torque in an internal combustion engine, comprising casting an intake manifold for the engine, heating the manifold to a temperature in the range of 400° to 500° F., exposing all internal surfaces of the manifold to a fluidized cloud of a finely divided, partially cured epoxy resin, causing said finely divided epoxy resin to fuse to the internal surfaces of said manifold to build up a smooth coating layer ranging in thickness from .031 inch to .062 inch, heating the coated manifold to complete the curing of the resin, installing said manifold between the carburetor and the individual cylinders in an internal combustion engine system, and running said engine with said intake manifold therein, thereby providing an internal combustion engine having increased torque.

References Cited in the file of this patent
UNITED STATES PATENTS

| | | |
|---|---|---|
| 1,282,266 | Merritt | Oct. 22, 1918 |
| 1,512,961 | Weil | Oct. 28, 1924 |
| 1,812,870 | Goldsborough | July 7, 1931 |